July 13, 1965 P. P. THOMAS 3,194,614
LOW FRICTION SLEEVE TYPE BUSHING
Filed Nov. 21, 1960
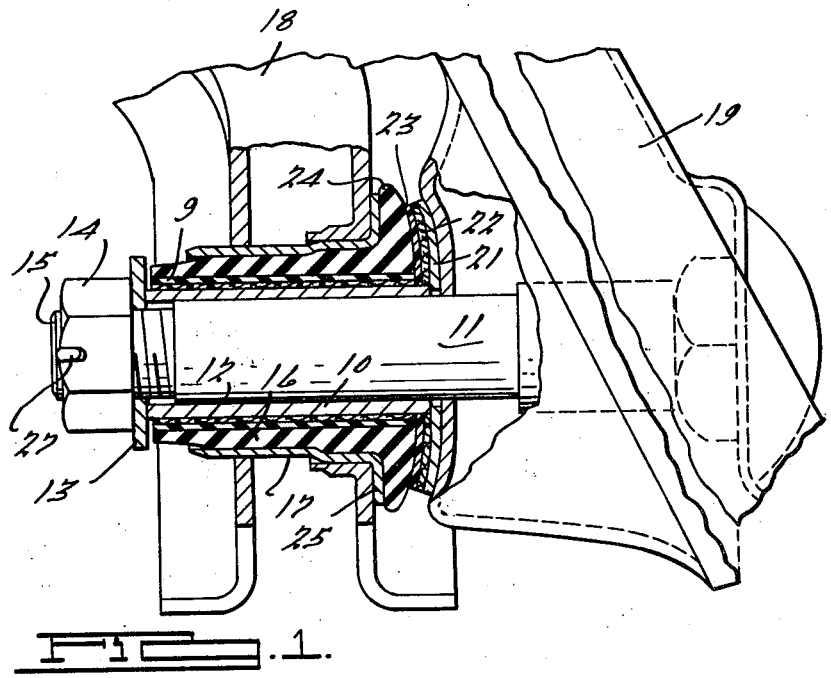
FIG. 1.
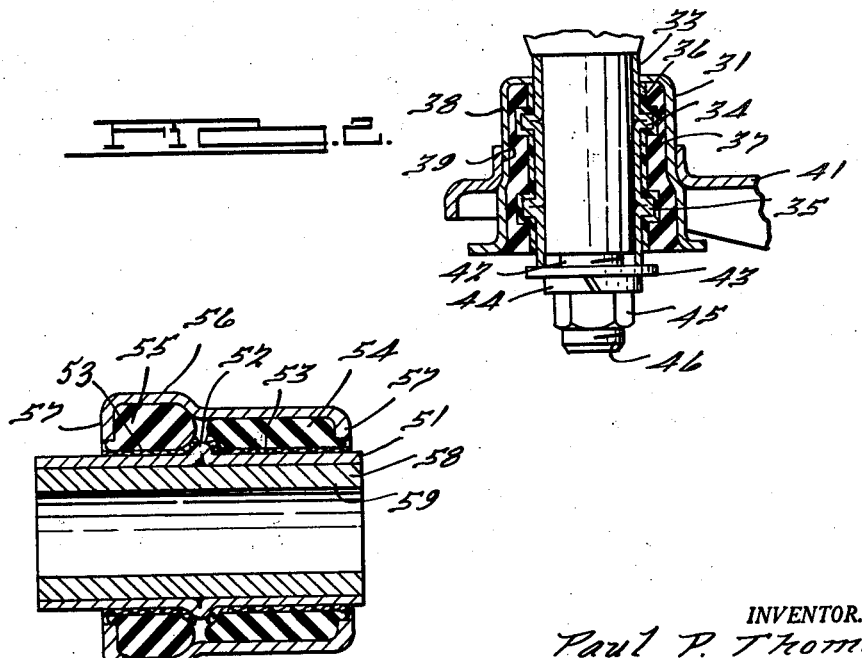
FIG. 2.
FIG. 3.
INVENTOR.
Paul P. Thomas.
BY
Karness, Dickey & Pierce
ATTORNEYS.

United States Patent Office 3,194,614
Patented July 13, 1965

3,194,614
LOW FRICTION SLEEVE TYPE BUSHING
Paul P. Thomas, Detroit, Mich., assignor to American Metal Products Company, Detroit, Mich., a corporation of Michigan
Filed Nov. 21, 1960, Ser. No. 70,602
1 Claim. (Cl. 308—26)

This invention relates to sleeve type bushings, and particularly to a sleeve type bushing having a low friction surface resiliently supported on a sleeve under predetermined pressure, and is a continuation-in-part of application, Serial No. 8,827, filed February 15, 1960, now abandoned.

The bearing of the present invention embodies a supporting sleeve having an outer polished surface and an interior diameter which permits the sleeve to slide upon a shaft, bolt, rod or the like, to which it is secured in fixed position. The sleeve is preferably of such length that when a washer is drawn against one end by a nut on the threaded end of a bolt, rod or the like, the opposite end will be forced against a wall to thereby clamp the sleeve against rotation. Upon the outer surface of the sleeve, a sleeve of low friction clothlike material made of polytetrafluoroethylene fibers, known in the trade as Teflon, is secured. The low friction sleeve is secured to a backup sleeve in some satisfactory manner, either by the resin entering the interstices of the Teflon clothlike material to be anchored about the fibers or filaments thereof, or the Teflon may have a backing of bondable material intermingled therewith so that when the bonding material is applied to the backup sleeve, the Teflon clothlike material is anchored in position. After the united Teflon and backup sleeve are placed upon the polished surface of the bearing sleeve, a rubber sleeve is extended thereover within an outer sleeve under pressure for resiliently supporting the low friction bearing to an element in a resilient manner. Where end thrust is desired, a Teflon washer may be employed to engage the end wall a washer or flange on the rubber sleeve of the bearing which resiliently maintains the low friction surface of the washer against the polished wall. It is within the purview of the invention to have the bearing sleeve provided with one or more outwardly extending flanges over which the Teflon clothlike material is disposed and retained and pressed against the surface of the bearing sleeve and about the flanges by resilient rubberlike material which is forced within an outer sleeve under pressure. The outer flange on the bearing sleeve prevents the relative longitudinal displacement between the low friction sleeve and the bearing sleeve and produces a resiliency to the device supported thereby.

Accordingly, the main objects of the invention are: to provide a sleeve type bearing having a bearing sleeve, a layer of Teflon over the outer surface of the bearing sleeve retained in position by a rubber sleeve which is compacted under pressure within an outer enclosing sleeve; to provide a sleeve type bearing constructed from a bearing sleeve having an outer polished surface over which a low friction Teflon reinforced sleeve is placed and forced under compression against the outer surface of the bearing by a rubber sleeve compacted within an outer retaining sleeve; to provide a sleeve type bearing having a cylindrical bearing with an outer polished surface mated with a low friction clothlike material containing fibers of Teflon disposed within a rubber sleeve which is supported under pressure within an outer supporting sleeve between means which prevent lateral displacement thereof; and, in general, to provide a unit low friction resilient bearing sleeve which is simple in construction and economical of manufacture.

Other objects and features of novelty of the invention will be specifically pointed out or will become apparent, when referring, for a better understanding of the invention, to the following description taken in conjunction with the accompanying drawings, wherein:

FIGURE 1 is a broken sectional view of a bolt having a low friction sleeve type bearing of the present invention secured thereto;

FIG. 2 is a sectional view of a sleeve type bearing on a bolt showing another form thereof, and FIG. 3 is a sectional view of structure, similar to that illustrated in FIG. 2, showing a further form which the invention may assume.

The sleeve bearings of the present invention are self-contained and are of the nonlubricating type. The inner bearing sleeve 10 has an inner diameter to snugly fit a shaft, rod, bolt 11 or the like and of such length as to extend behind the low friction sleeve 12 which engages the surface thereof. When a washer 13 is tightened against the end of the sleeve 10 in some suitable manner, such as by a nut 14 on the threaded end 15 of the bolt, the sleeve 10 will be maintained in fixed relation thereto. The low friction sleeve 12 may be woven, knitted or otherwise produced from Teflon fibers to provide a clothlike material having an inner facing of the low friction Teflon fibers. The clothlike material has a backing material 9 secured thereto which may be resilient or solid to form a composite sleeve which is disposed over the outer polished surface of the sleeve 10 to which it is conformed by pressure from a resilient sleeve 16 when the material 9 is rubber or similar resilient material. The elastomeric or rubberlike material 16 is compressed within an outer sleeve 17 which is disposed within a cross arm 18 and secured by the bolt 11 to the chassis frame rail 19. The chassis frame rail has a bearing washer 21 welded or otherwise secured to one face of the rail, with the bolt 11 extending therethrough. A low friction washer has a face of Teflon clothlike material 22 abutting the washer 21 and reinforced by a backing portion 23 secured thereto. The backing portion may be a resin which physically anchors the fibers or filaments of the Teflon clothlike material or which bonds the bondable threads or fibers intermingled or woven with those of the Teflon material. The rubber sleeve 16 has a flanged end portion 24 which extends between a flange 25 on the outer sleeve 17 and the backing portion 23. This provides lateral pressure between the arm 18 and the chassis rail 19 and cushions any lateral movement which might occur therebetween. A similar flange 24 could be provided on the opposite end adjacent to the washer 13 in contact therewith if further cushioning would ever be desired. When a cotter pin 27, the nut 14 and the washer 13 are removed, the arm 18 along with the sleeve 10 may be removed from the bolt 11, or the bolt may be removed from the sleeve 10 and the chassis rail 19. It is to be understood that the outer sleeve 17 may be welded or otherwise secured to the cross arm 18.

An improved self-contained bearing 31 is illustrated in FIG. 2, that wherein a thin inner metal bearing sleeve 22 has a pair of radially outwardly bent portions forming a pair of spaced, outwardly disposed annular flanges 34 and 35 located inwardly of the ends of the sleeve. A clothlike sleeve 36 of low friction nonbonding material, such as Teflon, is placed over the sleeve 33 and the flanges 34 and 35 thereof. A resilient sleeve 37 of rubber or like elastomeric material is placed over the clothlike element and compressed within a cuplike outer metal sleeve 38. The cuplike sleeve is disposed within an annular aperture 39 of an arm 41 and welded or otherwise secured thereto. The sleeve 33 is secured in fixed relation to a stud 42 by a lock washer 44 and a nut 45 which is screwed upon the threaded end 46 of the stud. With this arrangement, the annular flanges 34 and 35 on the bearing sleeve 33 prevent the lateral displacement of the arm 41 on the stud 42 while resiliently supporting the arm 41 thereon.

A similar sleeve type bearing is illustrated in FIG. 3, that wherein a thin inner metal sleeve 51 is expanded near the center to provide an outwardly disposed annular flange 52. A layer of clothlike material 53, made from fibers having low friction characteristics, such as Teflon, is placed on each end of the sleeve. Over the layer 53, sleeves 54 and 55 of rubber or similar resilient material are disposed and compressed within a sleeve 56. Inwardly directed end flange 57 on the sleeve 56 in combination with the flange 52 maintain the bearing sleeve 51 against substantial axial movement relative to the outer sleeve 56. The sleeve type bearing thus constructed may be slid upon a shaft, bolt, arbor or the like, as illustrated in FIGS. 1 and 2, and locked thereon in the manner illustrated or in any other manner.

It will be noted that a heavy sleeve 58 is secured within the sleeve 51 by press-fitting, brazing, welding or the like. The diameter of the aperture 59 in the sleeve 58 is such as to receive the shaft, bolt, rod or the like on which it is to be mounted. The bearing sleeve 51 and its reinforcing inner sleeve 58 are of the same length, longer than the sleeve 56, so that the bearing can be locked upon the shaft by a washer 43, lock washer 44, and nut 45 in the manner pointed out hereinabove.

What is claimed is:

A cylindrical bearing comprising an inner metal sleeve having a generally cylindrical outer bearing surface, an outer metal sleeve surrounding said inner sleeve, said inner sleeve having an outwardly bent portion forming an annular flange on the outer bearing surface thereof intermediate the ends of the inner sleeve, the ends of said outer sleeve extending inwardly to form annular end flanges, a cloth sleeve having an inner surface of low friction fibers surrounding said inner sleeve on each side of the flange thereof, and a pair of resilient sleeves of elastomeric material compressed between said outer sleeve and cloth sleeves on each side of the inner sleeve flange and maintaining said cloth sleeves in snug mated sliding engagement with the outer bearing face of said inner sleeve, one of said resilient sleeves cooperating with said inner sleeve flange and one of said outer sleeve flanges to inhibit axial movement between the sleeves in one direction and the other of said resilient sleeves cooperating with the inner sleeve flange and the other of said outer sleeve flanges to inhibit axial movement between said sleeves in the opposite direction.

References Cited by the Examiner
UNITED STATES PATENTS

| | | |
|---|---|---|
| 1,913,513 | 6/33 | Rossman et al. |
| 2,461,626 | 2/49 | Booth. |
| 2,797,929 | 7/57 | Herbener _____ 287—85 |
| 2,804,886 | 9/57 | White. |
| 2,827,303 | 3/58 | Herbener. |
| 2,846,251 | 8/58 | Herbener. |
| 2,880,027 | 3/59 | Everitt et al. |
| 2,885,248 | 5/59 | White. |
| 2,907,612 | 10/59 | White _____ 308—238 |
| 3,039,831 | 6/62 | Thomas _____ 308—26 |

ROBERT C. RIORDON, *Primary Examiner.*

RICHARD A. DOUGLASS, FRANK SUSKO,
*Examiners.*